March 15, 1960

C. A. KNAPP ET AL 2,928,548

SCUM SKIMMER BLADE

Filed Feb. 4, 1958

INVENTORS
Charles A. Knapp
Robert L. Yocum
BY
William S Henry
ATTORNEY

March 15, 1960

C. A. KNAPP ET AL 2,928,548

SCUM SKIMMER BLADE

Filed Feb. 4, 1958

INVENTORS
Charles A. Knapp
Robert L. Yocum
BY
William S Henry
ATTORNEY

United States Patent Office 2,928,548
Patented Mar. 15, 1960

2,928,548

SCUM SKIMMER BLADE

Charles A. Knapp, Glenbrook, and Robert L. Yocum, Norwalk, Conn., assignors to Dorr-Oliver Incorporated, Stamford, Conn., a corporation of Delaware Application February 4, 1958, Serial No. 713,230

15 Claims. (Cl. 210—525)

This invention relates to a scum skimmer blade for removing scum from the surface of liquid contained in a treatment vessel, such as a sedimentation unit. The invention is of particular use in a flocculation compartment of the type shown in Patents Nos. 2,268,475 and 2,289,112 wherein fixed flocculation paddles are suspended from above and extend down into a flocculation compartment containing cooperative movable flocculation paddles.

The present method of removing scum from such a flocculation compartment consists of an air blow system in which a plurality of air conducting conduits, rotatably connected with an air pump, are attached to the movable flocculation paddles. Air nozzles extending from the terminus of these conduits above the level of the flocculation tank blow air radially over the scum surface thus moving the scum to peripheral outlet means. Such a blower system is high in initial cost and expensive to maintain and operate. Therefore, it is a primary object of this invention to replace the present air blower system with a greatly simplified and inexpensive mechanical scum skimmer blade having an additional highly desirable function as described immediately below.

Heretofore scum skimmer blades, both mechanical and air skimmer types, have been designed only to move the floating scum surface to an outlet whereas the scum skimmer blade of this invention performs the dual function of removing floating scum to the outlet while simultaneously eliminating or reducing a substantial part of the scum load.

The scum skimmer blade of the present invention is based on the proposition that a substantial amount of scum produced in a sedimentation compartment contains settleable material which is buoyed up by air bubbles entrained in the feed and/or gas bubbles evolved in operation of the unit. Thus, a substantial amount of the scum can be settled out as sludge if these bubble particle combinations can be disassociated and the particles resubmerged or wetted.

A further primary object of this invention, therefore, is to produce a mechanical scum skimmer for a sedimentation type clarifier which eliminates some of the scum and thereby reduces the scum load while simultaneously removing scum which cannot be eliminated.

Another object of this invention is to produce a discontinuous scum skimmer blade for a flocculation compartment of the type having a plurality of fixed flocculating paddles suspended from above and extending down into the compartment containing cooperating intermeshed movable flocculating paddles.

Another object of this invention is to produce a scum skimmer blade to provide eddies at the liquid scum interface of a flocculation compartment without interfering with the formation of flocs or destroying flocs already formed.

It is a further object of this invention to accomplish the foregoing objects in an exceedingly simple and economic manner.

In order that it may be clearly understood and readily carried into effect, the invention will now be described, by way of example, with reference to the accompanying drawings.

Figure 1:
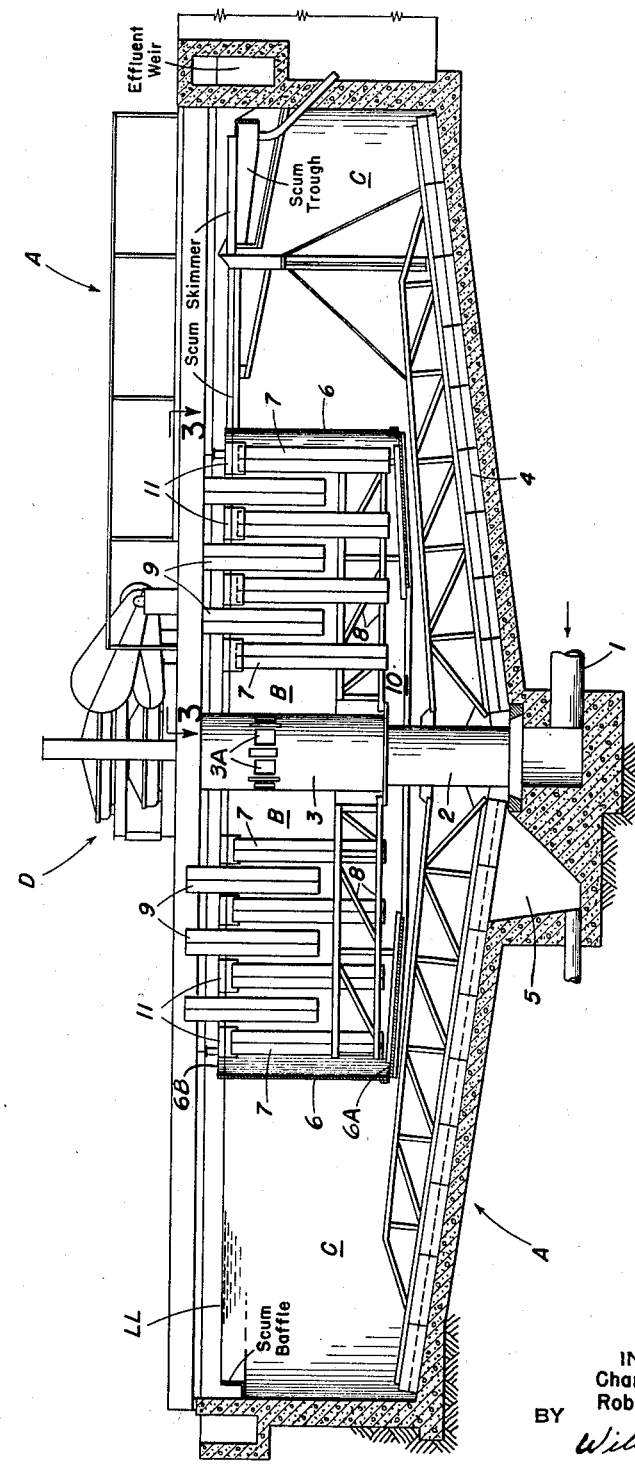
Figure 1 is a vertical sectional view of flocculation apparatus combined with a clarifier, incorporating the scum skimmer blade of our invention.

Figure 1 illustrates a specific example of the use of the invention in a flocculation and sedimentation apparatus, generally designated A, of well-known construction and operation; therefore, the following brief description of such apparatus is given for a complete understanding of the invention. Feed materials to be clarified (water, sewage, trade waste and the like) are fed to the flocculation compartment B, through conduit 1. A hollow turnable member 2 extends vertically through a tubular carrying member 3 to the driving apparatus generally designated D. The hollow turnable member 2 drives the rake structure 4 at the bottom of the clarifier compartment C to deliver settleable material or sludge to an underflow outlet 5. The tubular carrying member 3 is provided with influent ports 3A which communicate with influent ports in the turnable member 2 (not shown) and the flocculation compartment B. The flocculation compartment is defined by a tank having sidewalls 6 extending above the liquid level LL and a sloping bottom wall 6A. Within the flocculation tank radially or longitudinally spaced apart movable flocculation paddles 7 are rotatably driven by tubular carrying member 3 provided with radially extended arms 8 to which the movable paddles 7 are attached in any suitable manner. Extending downwardly into the flocculation compartment B are a series of immovable flocculation paddles 9, fixed to an overhead beam and alternatively longitudinally spaced within the flocculation compartment to allow the rotating blades 7 to pass therebetween. Influent issuing from ports 3A is gently agitated by the flocculation paddles 7 and 9 as it passes through the flocculation compartment into a lower concentric annular exit 10. The influent then passes into a sedimentation clarifier compartment C where it is separated into sludge forming at the bottom of the compartment C and clear liquid overflowing at the periphery of such compartment.

Within the flocculation compartment B lighter material floats to the top of the flocculation compartment forming a scum surface. A high percentage of such scum contains settleable particulate material buoyed up by bubbles introduced with the feed, and/or gas bubbles evloved in the flocculating process.

The scum skimmer blades 11 are attached adjacent the top of movable paddles 7, and extend at least to the liquid-scum interface or alternatively into the scum surface floating at the top of said compartment to provide a skimming action to radially move the scum and at the same time create eddies at the liquid-scum interface to disassociate or shear settleable particles from the attached bubbles. The scum which is plowed radially to the periphery of the flocculation compartment B is removed therefrom in any well-known manner or allowed to overflow the upper peripheral edge of the tank 6 at 6B. The scum entering compartment C is removed therefrom in the usual manner by a continuous scum skimmer blade, attached to and driven by the sludge rake structure, and associated scum trough as shown in Fig. 1.

Figure 2:
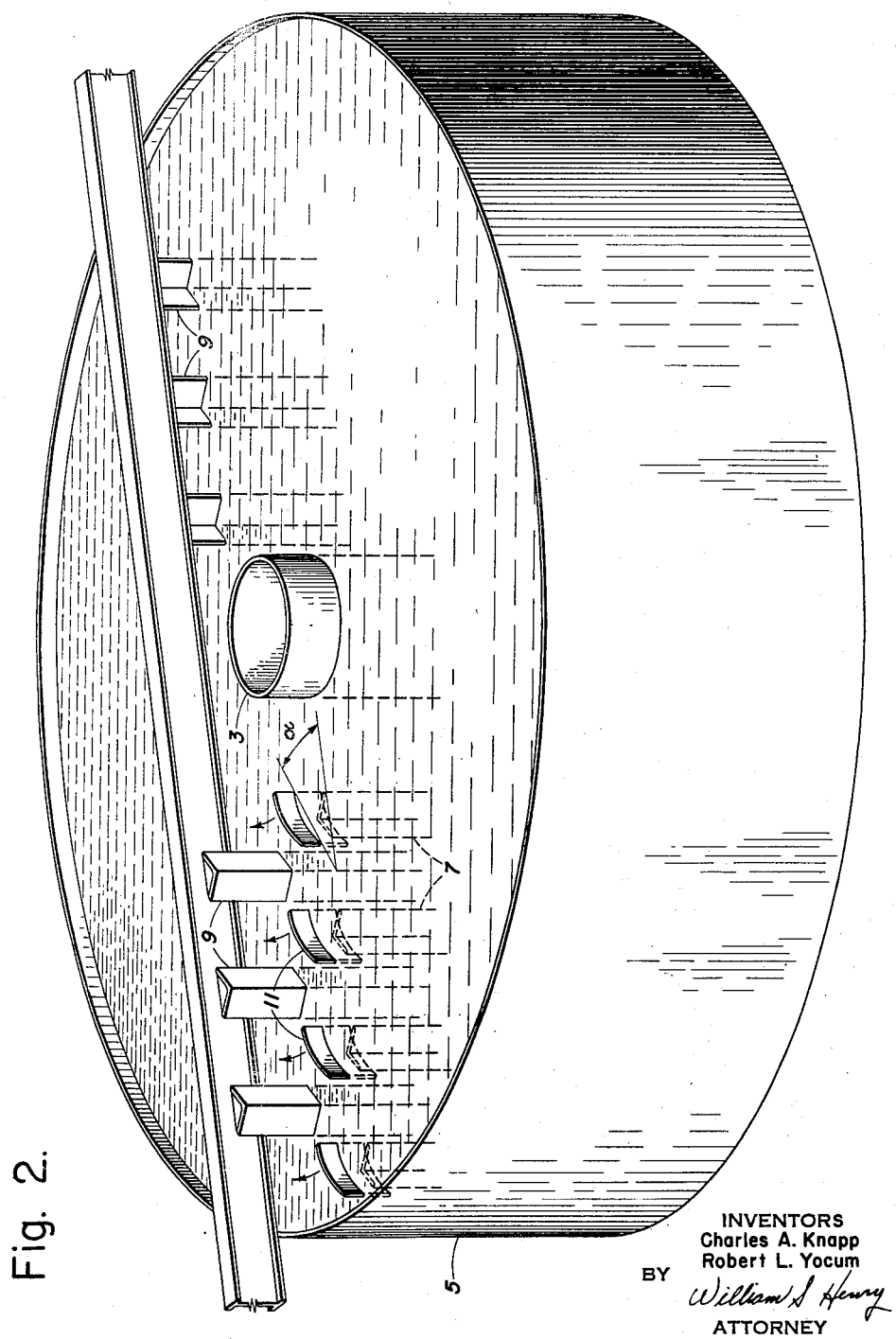
Figure 2 is a partial perspective and diagrammatic view of a flocculation compartment utilizing the scum skimmer blade of the invention.

As shown in Figure 2, each of the scum skimmer blades 11 are secured to a paddle 7 and displaced horizontally at an angle α with respect to the path of travel of paddle 7 so that the leading face of each blade 11 faces generally away from the center of the compartment. Each skimmer blade may be set at the same or a different angle α and is of a length sufficient to allow it to pass between fixed paddles 9. In Figure 2, blades 11 are secured to paddles 7 in parallel relation therewith; however, the blades may be tilted from the vertical in either direction. That is, the blades may be tilted so that the top edge of the blade is leading or extends beyond the leading edge of the paddle 11 and, alternatively, the blades may be tilted in the other direction so that the top edge of the blade 11 is trailing paddle 7. As the skimmer blades 11 are rotated they force scum to the periphery of the tank 6 while at the same time imparting shear force generated by the eddies created at the liquid-scum interface which disassociates gas or air bubbles attached to the particulate solids in the scum and allows these bubbles to escape so that the particles having a specific gravity less than the liquid in the tank can be re-wetted and ultimately settle out of the flocculation compartment.

Figure 3:
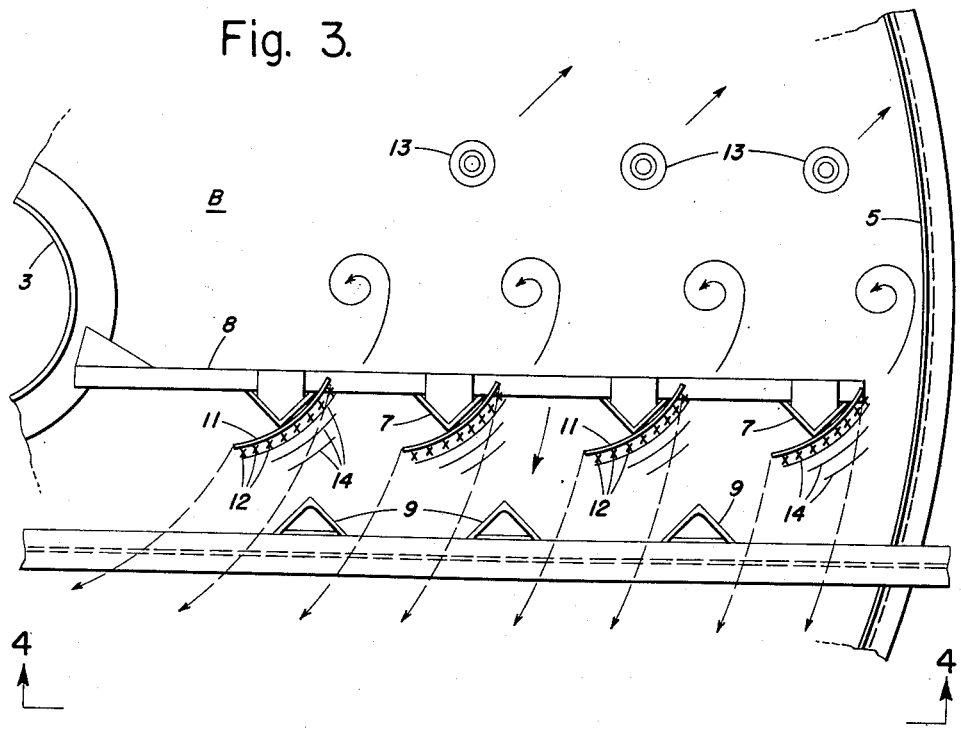
Figure 3 is a partial detailed plan view of the invention.
Figure 4:
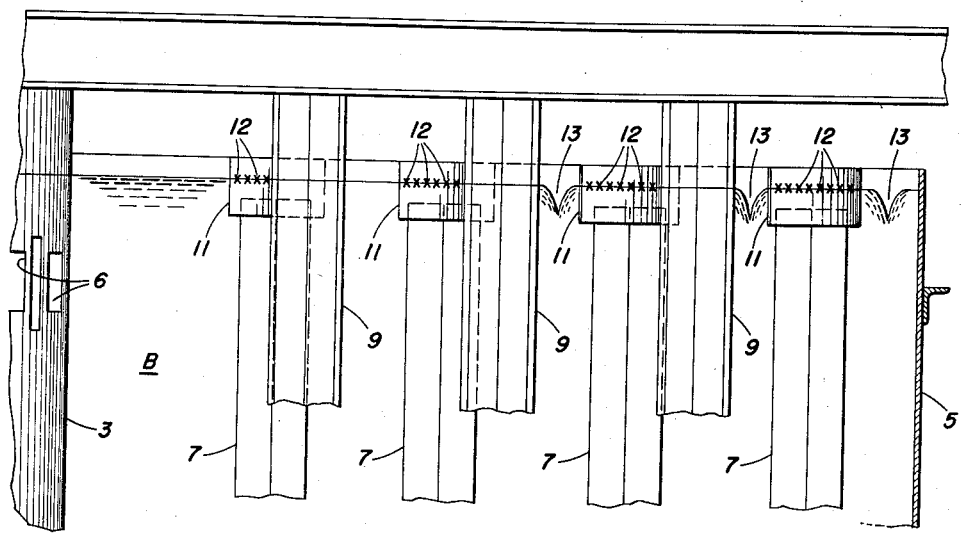
Figure 4 is a side elevation of Figure 3.

Referring to Figures 3 and 4, a series of X's designated 12 are used to illustrate the eddies created at the liquid-scum interface as the paddles 11 move through compartment B. Reference numeral 13 indicates the whirlpool or vortices created at the tips of the blades 11 as they rotate through the flocculation compartment. This aids in disassociation of the bubble-particle combination due to the shear forces inherent in a whirlpool while simultaneously moving scum to the periphery of the tank 5 due to the wave or plowing action designated 14.

The scum skimmer blade of our invention will also have an important application in other sedimentation units since it will reduce the quantity of solids taken off as scum. On such apparatus a scum skimmer blade utilizing the invention would consist of a combined discontinuous and continuous scum skimmer blade. That is, in a center feed thickener, the scum skimmer blade would consist of a radial portion extending from the center of the sedimentation unit and comprising a series of separate blades similar to the arrangement shown in Figs. 2, 3 and 4 and the outer end portion of the blade would be continuous. Referring to Fig. 1, it will be seen that the overall skimming apparatus consists of a first radially extending discontinuous skimmer blade terminating in a second peripheral continuous skimmer blade segment. If Fig. 1 is considered with the flocculation tank 5 and the flocculation paddles 7 and 9 removed it can be easily seen that the blades 11 can be driven by a boom such as an angle iron attached to the tubular carrying member 3 above or below the liquid level LL. The usual continuous skimmer blade shown in Fig. 1 may be separately driven as shown in Fig. 1 or it may be detached from the rake structure and connected to the discontinuous scum skimmer.

It will be seen from the foregoing that this invention provides a scum skimmer apparatus which performs the dual function of removing scum while simultaneously reducing the scum load produced in a flocculation compartment or other sedimentation type clarifiers and thickeners.

Many modifications of the foregoing will be apparent to those skilled in the art and the foregoing is given by way of description only.

We claim:

1. A combined flocculating and scum skimming mechanism in a tank comprising, in combination, a submerged carrier member turnable about a vertical axis; a set of upstanding vertical flocculation paddles carried by said turnable member spaced radially relative to said axis; an arrangement of depending flocculation paddles supported fixedly from above the tank and spaced with respect to one another and in co-operative relationship with said upstanding paddles, such that respective upstanding paddles will move with ample clearance through the spaces between respective depending paddles; and scum skimming blade means supported on said turnable member spaced upwardly therefrom so as to extend at least slightly below the liquid level in the tank, and at least slightly above the liquid level in the tank, and positioned at an angle relative to the path of movement such as to produce surface eddies in the wake of said blade means moving in the paths of respective upstanding paddles, and to cause said eddies together with entrapped scum to move outwardly away from said axis.

2. A combined flocculating and scum skimming mechanism in a tank comprising, in combination, a set of upstanding vertical flocculation paddles, spaced radially relative to the center of the tank and supported to be turnable about a vertical axis; a row of depending spaced flocculation paddles supported fixedly from above the tank spaced with respect to one another in co-operative relationship with said upstanding paddles such that the respective upstanding paddles will move with ample clearance through the spaces between respective depending paddles; and scum skimming blades provided at the upper ends of said respective upstanding paddles so as to extend at least slightly below and at least slightly above the liquid level in the tank and positioned at an angle relative to the path of movement such as to produce surface eddies in the wake of said blades moving together with said paddles and to cause said eddies together with entrapped scum to move outwardly away from said axis.

3. The sedimentation unit according to claim 2, wherein each said upstanding paddle carries a skimming blade substantially wider in a radial direction than the radial extent of the respective supporting paddle.

4. The sedimentation unit according to claim 2, wherein said upstanding paddles are of V-shaped cross-section with the apex thereof pointed forwardly, and a skimming blade is mounted upon the outer shank of the V-shape of the paddle.

5. The sedimentation unit according to claim 2, wherein said skimming blades are shaped so as to present a forwardly convex face.

6. The sedimentation unit according to claim 2, wherein said upstanding paddles are of V-shaped cross-section with the apex thereof pointed forwardly, and a skimmer blade is mounted upon the outer shank of the V-shape and said blades are shaped so as to present a forwardly convex face.

7. The sedimentation unit according to claim 2, with the addition of scum skimming means rotatable about said center to operate in said quiescent zone for outwardly moving scum including scum transferred from said flocculation compartment to discharge from said quiescent zone.

8. In a sedimentation unit having a flocculation compartment located centrally in a settling tank and communicating with the quiescent settling zone surrounding the compartment, a combined flocculating and scum skimming mechanism comprising, in combination, a submerged carrier member turnable about the center; a set of upstanding vertical flocculating paddles carried by said turnable member spaced radially relative to a vertical axis; an arrangement of depending flocculating paddles suported fixedly from above the tank and spaced with respect to one another and in co-operative relationship with said upstanding paddles, such that respective upstanding paddles will move with ample clearance through the spaces between respective depending paddles; and scum skimming blade means supported on said turnable member spaced upwardly therefrom so that said blades extend at least slightly below and at least slightly above the liquid level in the tank, and positioned at an angle relative to the path of movement such as to produce surface eddies in the wake of said blade means moving in the paths of respective upstanding paddles, and to cause said eddies together with entrapped scum to move outwardly for transfer from the flocculation compartment into the surrounding quiescent settling zone.

9. In a sedimentation unit having a flocculation compartment located centrally in a settling tank and communicating with a quiescent settling zone surrounding the compartment, a combined flocculating and scum skimming mechanism comprising, in combination, a set of upstanding vertical flocculation paddles, spaced radially relative to the center of the tank and centrally supported to be turnable about the center, a row of depending spaced flocculating paddles supported fixedly from above the tank spaced with respect to one another in co-operative relationship with said upstanding paddles such that the respective upstanding paddles will move with ample clearance through the spaces between respective depending paddles; and scum skimming blades provided at the upper ends of respective upstanding paddles so as to extend at least slightly below and at least slightly above the liquid level in the tank and positioned at an angle relative to the path of movement such as to produce surface eddies in the wake of said blades and to cause said eddies together with entrapped scum to move outwardly for transfer from the flocculation compartment into the surrounding quiescent settling zone.

10. The sedimentation unit according to claim 9, wherein each said upstanding paddles carries a skimming blade substantially wider in a radial direction than the radial extent of the respective supporting paddle.

11. The sedimentation unit according to claim 9, wherein said upstanding paddles are of V-shaped cross-section with the section with the apex thereof pointed forwardly, and a skimming blade is mounted upon the outer shank of the V-shape of the paddle.

12. The sedimentation unit according to claim 9, wherein said skimming blades are shaped so as to present a forwardly convex face.

13. The sedimentation unit according to claim 9, wherein said upstanding paddles are of V-shaped cross-section with the apex thereof pointed forwardly, and a skimmer blade is mounted upon the outer shank of the V-shape and said blades are shaped so as to present a forwardly convex face.

14. The sedimentation unit according to claim 9, with the addition of scum skimming means rotatable about said center to operate in said quiescent zone for outwardly moving scum including scum transferred from said flocculation compartment to discharge from said quiescent zone.

15. In a sedimentation unit having a flocculation compartment located centrally in a settling tank spaced from the tank bottom and communicating with a quiescent settling zone surrounding the compartment, a combined flocculation and scum skimming mechanism comprising, in combination, a first submerged carrier member in said flocculation compartment turnable about the center of the unit; a set of upstanding vertical flocculating paddles carried by said turnable member spaced radially relative to the center of the tank; a row of depending flocculating paddles supported fixedly from above the tank spaced with respect to one another and in co-operating relationship with said upstanding paddles such that respective upstanding paddles will move with ample clearance through the spaces between respective depending paddles; scum skimming blades at the upper ends of respective upstanding paddles so that said blades extend at least slightly below and at least slightly above the liquid level in the tank and positioned at an angle relative to the path of movement such as to produce surface eddies in the wake of said blades and to cause said eddies together with entrapped scum to move outwardly for transfer from the flocculation compartment into the surrounding settling zone; a second submerged carrier member turnable about said center extending in the space between said flocculation compartment and the tank bottom; and additional scum skimming means mounted on said second carrier member to operate in said quiescent zone for outwardly moving scum including scum transferred from said flocculation compartment to discharge from said quiescent zone incident to rotation of said second submerged carrier member.

References Cited in the file of this patent

UNITED STATES PATENTS

| | | |
|---|---|---|
| 907,148 | Hoffman | Dec. 22, 1908 |
| 1,398,394 | Robbins | Nov. 29, 1921 |
| 1,906,526 | Bradford | May 2, 1933 |
| 2,268,475 | Barby | Dec. 30, 1941 |
| 2,425,065 | Kivari | Aug. 5, 1947 |
| 2,520,540 | Green | Aug. 29, 1950 |
| 2,651,615 | Kelly et al. | Sept. 8, 1953 |